United States Patent [19]

Conti et al.

[11] Patent Number: 4,467,054

[45] Date of Patent: Aug. 21, 1984

[54] FOAMS BASED ON LOW FORMALDEHYDE-EMISSION UREA-FORMALDEHYDE RESIN AND PROCESS FOR THEIR PREPARATION

[75] Inventors: Natale Conti, Rasa; Massimo Tardani, Busto Arsizio, both of Italy

[73] Assignee: Montedison S.p.A., Milan, Italy

[21] Appl. No.: 378,182

[22] Filed: May 14, 1982

[30] Foreign Application Priority Data

May 15, 1981 [IT] Italy .................... 21725 A/81

[51] Int. Cl.$^3$ .................................... C08J 9/30
[52] U.S. Cl. ............................ 521/188; 521/187
[58] Field of Search ..................... 521/187, 188

[56] References Cited

U.S. PATENT DOCUMENTS

| | | | |
|---|---|---|---|
| 2,168,981 | 8/1936 | Flood | 521/188 X |
| 2,323,831 | 1/1939 | Menger | 521/102 X |
| 2,625,524 | 12/1951 | Kvalnes | 521/188 X |
| 2,789,095 | 11/1952 | Lindvig | 521/106 X |
| 3,979,341 | 9/1976 | Widmann | 521/188 X |
| 4,092,277 | 5/1978 | Moore | 521/188 X |
| 4,225,680 | 9/1980 | Williams | 521/188 X |

*Primary Examiner*—John Kight, III
*Assistant Examiner*—Garnette D. Draper

[57] ABSTRACT

Composition based on a urea-formaldehyde polycondensate, suitable for the preparation of solid foams to be used as thermal insulating materials, characterized in that said composition contains hexamethylenetetramine in quantities comprised between 2% and 15% by weight with respect to the content of dry product of the composition.

2 Claims, 2 Drawing Figures

FOAMS BASED ON LOW FORMALDEHYDE-EMISSION UREA-FORMALDEHYDE RESIN AND PROCESS FOR THEIR PREPARATION

BACKGROUND OF THE INVENTION

Urea resins based on urea-formaldehyde condensates in the form of foams to be used as thermal insulation, are known since quite some time and have been used for filling the hollow space of cavity walls and, for shaping into blocks and panels.

These foams are prepared by means of continuously or intermittently operating apparatuses consisting of:
a container (A) for the aqueous surfactant solution additioned with a hardner of the resin;
a container (B) for the urea-formaldehyde resin (suitably dissolved or diluted and filtered);
a pump, a compressor and a foaming-gun.

The apparatus works in such a way that the solution of container (A) will give place to a foam by blowing in air: this foam, which will act as a support or carrier, is mixed with the ureic resin solution, and the latter, in the presence of the hardner, will harden giving place to a stable solid foam.

In this way there will be obtained foams which in the humid state will have a density of 50–120 Kg/cu.mt. and in the dry state will have a density of 10–30 Kg/cu.mt. The full hardening and drying occurs in 20–30 days, depending on the temperature conditions, ventilation, and the permeability of the walls.

These foams have, however, the drawback of expelling considerable quantities of formaldehyde (1–6% by weight with respect to the dry foam) and thus cause discomforts and ecological problems both in the application step as well as during the drying.

This latter drawback is particularly felt when the foam is applied, as is often the case, to the hollow space or cavity in already inhabited buildings.

In the preparation of insulating foams based on urea-formaldehyde resins there may be used as starting material liquid resins (in solution) or solid resins which have to be dispersed in water shortly before use. The characteristics of the foams thus obtained have been recorded on Table 1.

The liquid resins offer the advantage of a lesser emission of formaldehyde by the foams obtained from them, but on the other side there are the drawbacks that they are less stable through time (see Table 2) and that they give foams which are less resistant to hydrolysis and have lower mechanical resistance.

The solid resins may be stored for a longer period before their use in the preparation of foams, and yield foams that are more stable through time and more resistant, but have a higher emission of formaldehyde.

The higher emission of formaldehyde by the foams obtained starting from solid resins is due to their higher molar ratio formaldehyde-urea (see Table 2). A lower molar ratio would reduce considerably the drawback of the expulsion of formaldehyde by the foam through time, but this cannot be achieved because said resins would not have the necessary stability in water.

This drawback was partly overcome by adding urea (15% to 25% by weight on the dry substance) or other formaldehyde-blocking agents to the aqueous resin dispersion shortly before use. The formaldehyde expelled during the drying phase may be thus reduced to 0.3%–0.9% by weight with respect to the dry foam.

The addition of urea involves, however, a considerable complication in the preparatory step, in as much as the urea has to be dissolved in the resin dispersion immediately before use; the dispersion itself must be heated in order to avoid precipitation due to the cooling caused by the urea dissolution and furthermore because there must be provided a control and correction of the pH which may have to be changed because of the addition of urea or other blocking agents.

Thus an object of this invention is to provide urea-formaldehyde resins suitably modified which, while preserving the advantages of the known resins (stability, low cost, simplicity of the processing equipment, high insulating power) yield foams possessing formaldehyde emission values much lower than those of the best foams known so far, and without involving the burdensome operations connected with the addition of urea immediately before the preparation of the foams.

By the process of this invention it is, moreover, possible to prepare ureic resins in the solid state, which once dispersed in water result in foams that together with the advantages already known for foams obtained starting from solid resins (good mechanical resistance, good stability through time), have the advantage of expelling very little formaldehyde during the drying phase.

THE PRESENT INVENTION

It has now been surprisingly ascertained that, by suitably modifying the formulation of the resin and possibly that of the aqueous solution of surfactant, a foam is obtained that is absolutely comparable with the foams commonly known, with respect to its other properties, but which has a considerably lower formaldehyde emission value.

In order to obtain the foams object of the present invention, the resin must be prepared following the following procedures:

(a) mixing together the formaldehyde with water and urea in such a ratio as to obtain a molar ratio formaldehyde-urea in the range of 2.2–1.7 at a pH=6.3–6.8;

(b) then admixing hexamethylenetatramine ("hexamine") in quantities comprised between 2 and 15% by weight on the dry end product, at a temperature of 40°–80° C. and a pH equal to 8.5–10.0;

(c) then heating up to 90°–95° C., adding an acid catalyst and by then condensing at 90°–120° C. at a pH of from 4.0 to 6.0, until attaining a viscosity of 50–120 cP (at 20° C.);

(d) neutralizing with sodium hydroxide up to a pH=6.0–7.0 and by then admixing urea up to a molar ratio formaldehyde-urea in the range of from 1.2–1.4; then condensing at 85°–95° C. until attaining a viscosity of 80–120 cP (measured at 20° C.);

(e) neutralizing with sodium hydroxide until reaching a pH of 7.5–9.0 and then cooling down to 25°–30° C.;

(f) optionally drying the mixture in order to obtain a powdery product.

The graphs reported in FIGS. 1 and 2 of the accompanying drawings, evidence now the resin modified with hexamine shows a much lower formaldehyde emission, not only with respect to the non-modified resin as such, but also with respect to the resin additioned with urea before the preparation of the foam.

Figure 1:
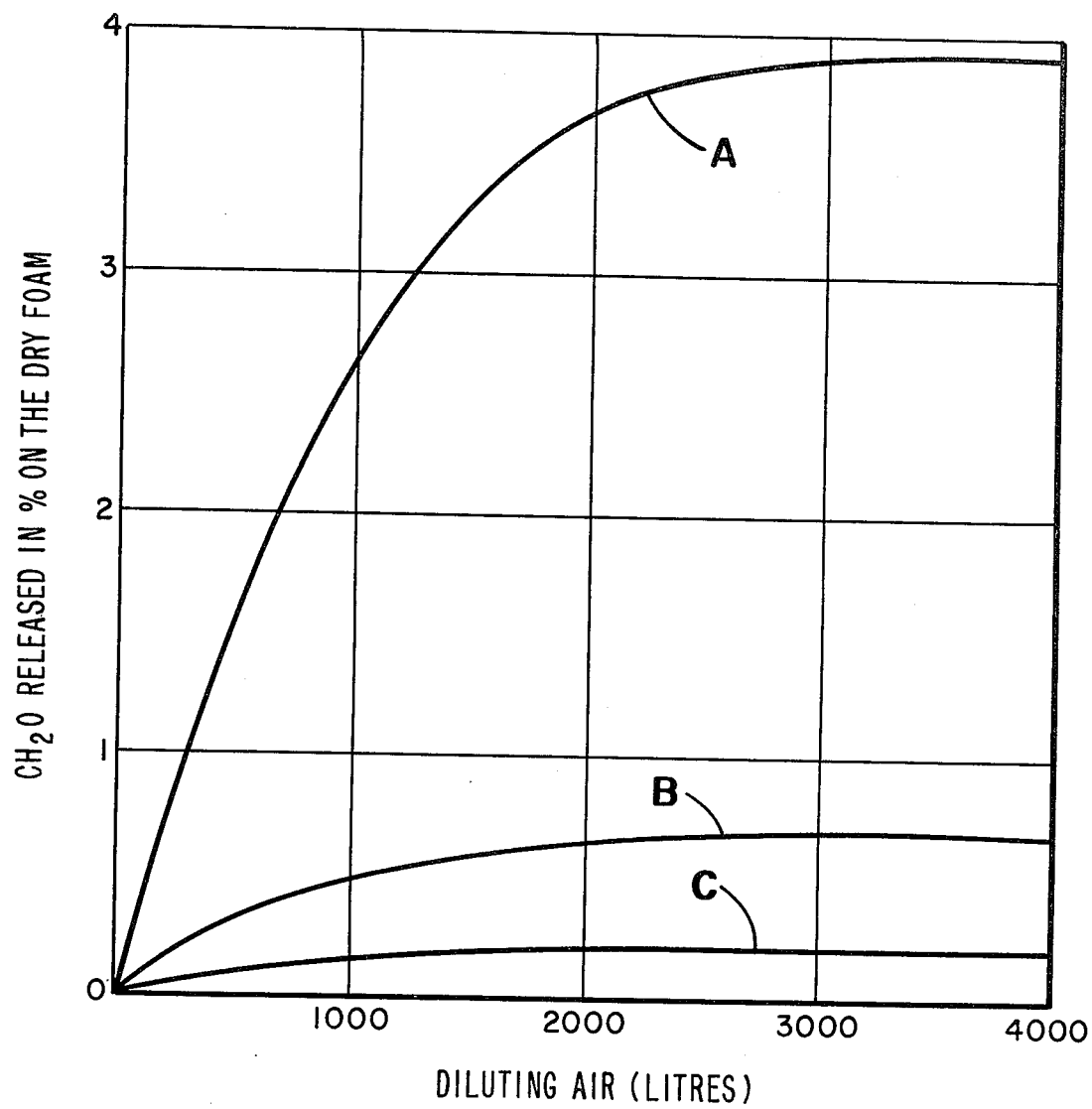
FIG. 1 is a graph showing the total emission of formaldehyde by foams just prepared (the diluting air was fed in at a flow rate of 1.5 lt/minute, at 20° C.).
Figure 2:
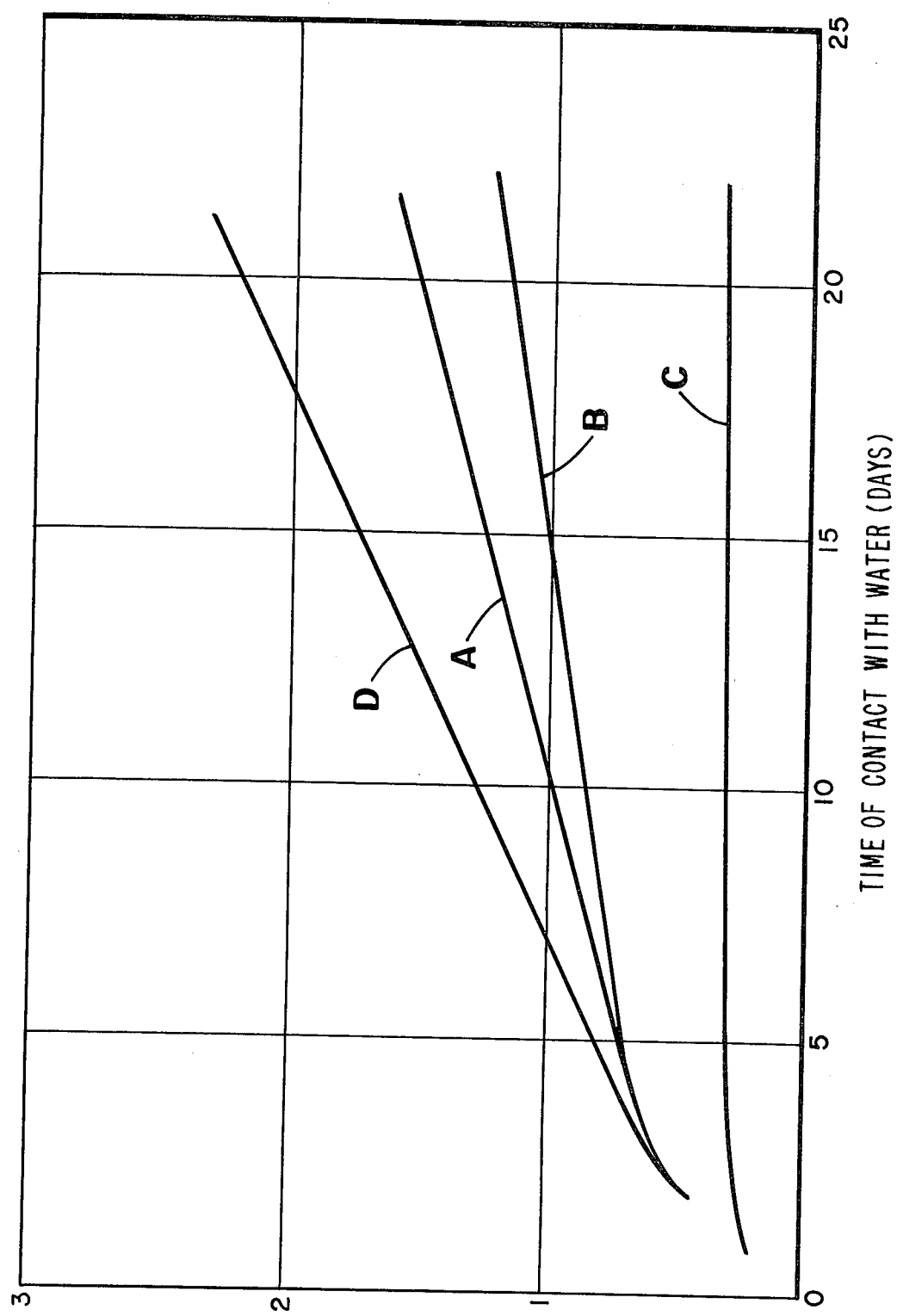
FIG. 2 is a graph showing the release of formaldehyde due to prolonged immersion in water at 70° C., owing to a hydrolytic effect.

A = standard resin of the solid type.
B = standard resin of the solid type additioned with urea.
C = resin according to the present invention.
D = standard resin of the liquid type.

EXAMPLE 1

"Formurea 80" (pre-condensate containing 57% of formaldehyde and 23% of urea) was mixed together with urea and water in such an amount as to obtain a mixture showing a molar ratio formaldehyde-urea of 1.9 at a pH of 6.5 and with a content of dry substance equal to 60%. To this mixture was then admixed 7.2% by weight (referred to the dry end product) of hexamine at a temperature of 60° C. and to a pH of 9.0. The whole was then heated up to 94° C. and it was then additioned with the acid catalyst (formic acid); the pH was equal to 4.5. The mixture was then condensed at 95° C. until reaching a viscosity of 100 cP (measured at 20° C.).

The whole was then partially neutralized with sodium hydroxide until attaining a pH equal to 6.0 and was then additioned with an aqueous urea solution at 71% concentration, until obtaining a molar ratio formaldehyde-urea of 1.30.

The whole was then condensed at 90° C. up to a viscosity of 95 cP (measured at 20° C.).

It was then neutralized with sodium hydroxide (pH = 7.5–8.2) and then cooled down to 25°–30° C. The syrup thus obtained was dried by means of a "Lurgi-atomizer".

33 parts of the resin thus obtained were dissolved in 67 parts of water.

Thereupon there were prepared 96 parts by weight of an aqueous mixture containing 0.5% of sodium dodecylbenzene sulphonate (surfactant) and 1.6% of phosphoric acid (catalyst).

Into a suitable apparatus there were then fed in the resin solution and the aqueous solution prepared as herein above indicated, by contemporaneously blowing in air so as to obtain a moist foam showing a density of 70 Kg/cu.mt.

The characteristics of the thus obtained foam have been recorded on Table 1 in a comparison with the foams prepared from conventional resins.

EXAMPLE 2

Aqueous solutions of formaldehyde, of urea and of water were mixed together in a molar ratio formaldehyde-urea equal to 1.8 and for a pH equal to 6.5 (dry product 58%). To this mixture was then admixed 13% of hexamine (referred to the dry end product) at a temperature of 50° C. and a pH of 9.0. The mixture was then heated up to 94° C. and was then additioned with formic acid at a pH 5.0 as a catalyst. The whole was then condensed at 100° C. to a viscosity of 50 cP (measured at 20° C.).

The mixture was then partially neutralized with sodium hydroxide to a pH of 6.2 and was then additioned with an aqueous solution of urea at a 71% concentration up to reaching a molar ratio formaldehyde-urea of 1.30. The mixture was then condensed at 90° C. up to a viscosity of 120 cP (measured at 20° C.).

It was then neutralized with sodium hydroxide up to a pH of 7.5–8.5 and then cooled down to 25° C. The final content of dry substance amounted to 50%.

66 parts of the resin thus obtained were dissolved in 33 parts of water.

Separately there was prepared an aqueous solution containing a surfactant (sodium dodecylbenzenesulphonate 0.5%) and a catalyst (phosphoric acid 1.6%).

The two solutions were fed into a suitable apparatus in a 1:1 ratio by weight together with air so as to obtain a moist foam showing a density of 65 Kg/cu.mt.

The characteristics of the foam thus obtained have been recorded on Table 1 in comparison with the foams prepared from resins of the prior art.

TABLE 1

| CHARACTERISTICS | FOAMS OF THE PRIOR ART | | Example 1 | Example 2 |
| --- | --- | --- | --- | --- |
| | from solid resin | from liquid resin | | |
| Shrinkage in % | <4 | <4 | <4 | <4 |
| Emission of $H_2O$, in g/lt (1) | 3–5 | 1–2 | 4.5 | 3.8 |
| Specific weight after drying in Kg/cu.m. | 10–14 | 8–12 | 11 | 12 |
| Resistance to compression (10% deformation) in Kg/sq.cm. | 0.18–0.30 | 0.05–0.15 | 0.20 | 0.25 |
| Emission of $CH_2$ during drying in % by weight on dry foam: | | | | |
| - formulation as such: | 2–6 | 1–2 | 0.15 | 0.16 |
| - additioned of urea | 0.3–0.9 | — | — | — |
| Absorption of water in % by volume (House Urban Dept. e DOE-USA) | 10–14 | 10 | 12 | 10 |
| Endurance of the foamed product in water at 50 °C. | >4 months | 1.5 months | >4 months | >4 months |

(1) measured according to House Urban Dept./ DOE-USA.

TABLE 2

| CHARACTERISTICS | Solid Resin | Liquid Resin |
| --- | --- | --- |
| Molar ratio Formaldehyde:Urea | 1.6:1–2:1 | 1.3:1–1.6:1 |
| Stability of the resin as such | ≧1 year | 2–3 months |

We claim:

1. A composition based on a formaldehyde-urea condensate, suitable for preparing solid foams to be used as thermal insulating material, and obtained according to the following procedures:

(a) mixing of formaldehyde with water and urea to obtain a molar ratio formaldehyde-urea of from 2.2 to 1.7 and a pH comprised between 6.3 and 6.8;
(b) addition of hexamethylenetetramine in a quantity comprised between 2% and 15% by weight with respect to the final dry product, at a temperature of between 40° and 80° C. and at a pH between 8.5 and 10;
(c) heating up to 90°–95° C., and successive addition of an acid catalyst and condensation at 90°–100° C. at a pH comprised between 4 and 6 until obtaining a viscosity of from 50 to 120 cP;
(d) neutralizing with sodium hydroxide up to a pH of between 6.0 and 7.0 and then adding urea until reaching a molar ratio formaldehyde-urea of between 1.2 and 1.4; then condensing at 85°–95° C. until reaching a viscosity between 80 and 120 cP (measured at 20° C.);
(e) neutralizing with sodium hydroxide up to a pH of between 7.5 and 7, and successive cooling down to 25°–30° C.;
(f) optionally finally drying the cooled product to obtain it in a powdery state.

2. Rigid foam, useful as thermal insulating material, and obtained by combining an aqueous solution of a composition according to claim 1 and an aqueous solution of a surfactant and hardening agents, and blowing air into the combined aqueous solutions to form a foam.

* * * * *